United States Patent
Sankaran et al.

(10) Patent No.: US 8,199,713 B2
(45) Date of Patent: Jun. 12, 2012

(54) FRACTIONAL FREQUENCY REUSE IN A COMMUNICATION SYSTEM

(75) Inventors: Chandrasekar Sankaran, Arlington Heights, IL (US); Stanley J. Benes, Round Lake Beach, IL (US); Philip J. Fleming, Glen Ellyn, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 395 days.

(21) Appl. No.: 12/611,207

(22) Filed: Nov. 3, 2009

(65) Prior Publication Data

US 2011/0103365 A1    May 5, 2011

(51) Int. Cl.
*H04W 4/00* (2009.01)
(52) U.S. Cl. .......................... 370/329; 455/447
(58) Field of Classification Search .................. 370/344, 370/329; 455/447
See application file for complete search history.

(56) References Cited

U.S. PATENT DOCUMENTS

| | | | |
|---|---|---|---|
| 7,558,577 B2 | 7/2009 | Dillon et al. | |
| 2009/0047971 A1 | 2/2009 | Fu | |
| 2009/0197623 A1* | 8/2009 | Oota | 455/509 |
| 2010/0214992 A1* | 8/2010 | Hart et al. | 370/329 |
| 2010/0215108 A1* | 8/2010 | Balachandran et al. | 375/260 |
| 2010/0248728 A1* | 9/2010 | Sun et al. | 455/450 |

FOREIGN PATENT DOCUMENTS

EP    2086274 A2    8/2009

OTHER PUBLICATIONS

Wu, Xinzhou et al.: Fractional Power Reuse in Cellular Networks, in Proc., Forty-Fourth Annual Allerton Conference, Allerton House, UIUC, Illinois, USA, WIIA.230, Sep. 27-29, 2006, pp. 372-381.
Xiao, Weimin et al.: "Uplink Power Control, Interference Coordination and Resource Allocation for 3GPP E-UTRA", in Proc. IEEE Vehicular Technology Conference, Sep. 2006, all pages.
Rao, Anil M.: "Reverse Link Power Control for Managing Inter-cell Interference in Orthogonal Multiple Access Systems", in Proc. Vehicular Technology Conference, 2007, VTC-2007 Fall. 2007 IEEE 66th, Sep. 30, 2007-Oct. 3, 2007, pp. 1837-1841.
Sankaran C et al.: Performance of Frequency Selective Scheduling and Fractional Frequency Reuse Schemes for WIMAX, 2009 IEEE 69th Vehicular Technology Conference; Apr. 26-29, 2009, Barcelona, Spain, IEEE, Piscataway, NJ, USA, Apr. 26, 2009, all pages.
Doppler K. et al.: "Interference Aware Scheduling for Soft Frequency Reuse", 2009 IEEE 69th Vehicular Technology Conference; Apr. 26-29, 2009, Barcelona Spain, IEEE, Piscataway, NJ, USA, Apr. 26, 2009, all pages.
Soumaya Hamouda et al.: "Dynamic Hard Fractional Frequency Reuse for Mobile WiMAX", Pervasive Computing and Communications, 2009, PERCOM 2009, IEEE International Conference on, IEEE, Piscataway, NJ, USA Mar. 9, 2009, all pages.
Patent Cooperation Treaty, International Search Report and Written Opinion of the International Searching Authority for International Application No. PCT/US2010/051734, Jan. 19, 2011, 14 pages.

* cited by examiner

*Primary Examiner* — Sai-Ming Chan

(57) ABSTRACT

An apparatus and method for fractional frequency reuse in a communication system. The method includes a first step 400 of partitioning a sub-frame into resource partitions, wherein at least one resource partition has frequency reuse of one and all other resource partitions have frequency reuse greater than one. A next step 408 includes scheduling resources for a mobile station in a sector in each resource partition used by that sector.

3 Claims, 4 Drawing Sheets

3 SECTOR SYSTEM

4 SECTOR SYSTEM

FRACTIONAL FREQUENCY REUSE IN A COMMUNICATION SYSTEM

FIELD OF THE INVENTION

This invention relates to wireless communication systems, in particular, to a mechanism for fractional frequency reuse in a wireless communication system.

BACKGROUND OF THE INVENTION

In a wireless communication system, a mobile station (MS) is assigned a frequency sub-channel and a time slot in a physical layer for its communications with a base station, nodeB, or access point (AP). Since there are limited resources in existing systems (note that there are two dimensions to the resources—time and frequency, hence the total available resource=bandwidth*time), frequency reuse plans can be utilized to share the same resources between different cells. Reusing the same resources in all sectors all the time can result in interference between neighboring MSs that are using the same frequency at the same time. This plan, referred to as a one-cell reuse, is a spectrally efficient reuse scheme for users close in to a cell site (e.g. 114 in FIG. 1B and 1C) but suffers from heavy interference issues for cell-edge users (e.g. 112 in FIG. 1B and 1C).

Fractional frequency reuse plans can be used for separate sectors within a single cell. One form of fractional frequency reuse plan that can be used for a single cell is to limit each sector to use only a fraction of the available resources for the cell site (such that the sum of the mutually disjoint fractions equals the total available resources). Examples of this plan are (in a N-sector per site system—e.g., N could be 3 or 4): (a) Allocate 1/N of the total bandwidth to each sector all the time, (b) Allocate the full bandwidth to each sector for 1/N of the time. This plan, referred to as multi-cell reuse plan, effectively reduces interference, but results in the loss of (N−1)/N resources within each sector, even for users that are closer in to the cell site and who don't suffer as much interference. Although this multi-cell reuse plan offers lower interference for cell edge users (e.g. 112 in FIG. 1B and 1C), it is not spectrally efficient for users close in to the cell site (e.g. 114 in FIG. 1B and 1C).

There is currently no fractional frequency reuse (FFR) technique that performs better than the one-cell reuse and multi-cell reuse fractional frequency reuse plans across different traffic models.

Accordingly, what is needed is a technique to mitigate the problems associated with the one-cell reuse and multi-cell reuse FFR reuse plans.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Skilled artisans will appreciate that common but well-understood elements that are useful or necessary in a commercially feasible embodiment are typically not depicted or described in order to facilitate a less obstructed view of these various embodiments of the present invention.

DESCRIPTION OF THE PREFERRED EMBODIMENTS

The present invention provides a framework to combine the benefits of the one-cell reuse and multi-cell reuse FFR reuse plans. In particular, the present invention allows all MSs in a sector to be scheduled in both the one-cell reuse and the multi-cell reuse zones of a sub-frame used by that sector, wherein a scheduler decides which MSs get resources at different instants in both zones. Specifically, the present invention partitions the available resources into a one-cell reuse zone, where the entire available resources of the cell cite is used by all sectors; and a multi-cell reuse zone, where each sector uses a fraction of the available resources (such that the sum of the fractions adds up to the total available resources), and then schedules MSs in a sector in both zones used by that sector as will be detailed below. The split between the zones (either in time or frequency) is configurable (but would need to be synchronized across sectors). Separate instances of a proportional fair (PPF) scheduler can be run in each zone, where each zone will have its own scheduler queue. Alternatively, users can be scheduled using one queue for both zones.

Figure 1A:
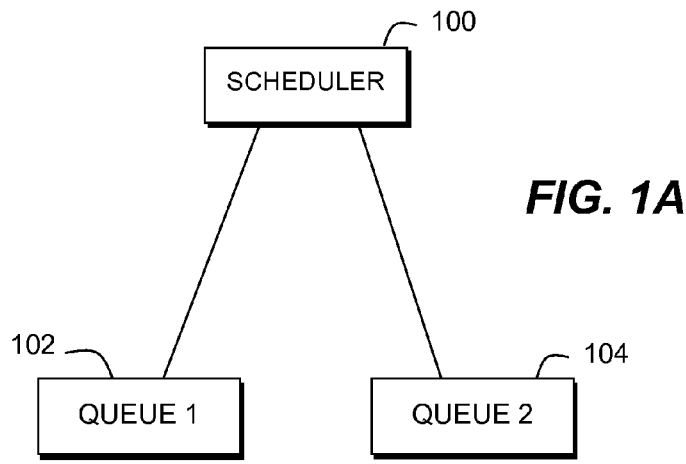
FIGS. 1A, 1B and 1C show an overview diagram of a wireless communication system, in accordance with the present invention.
Figure 1B:
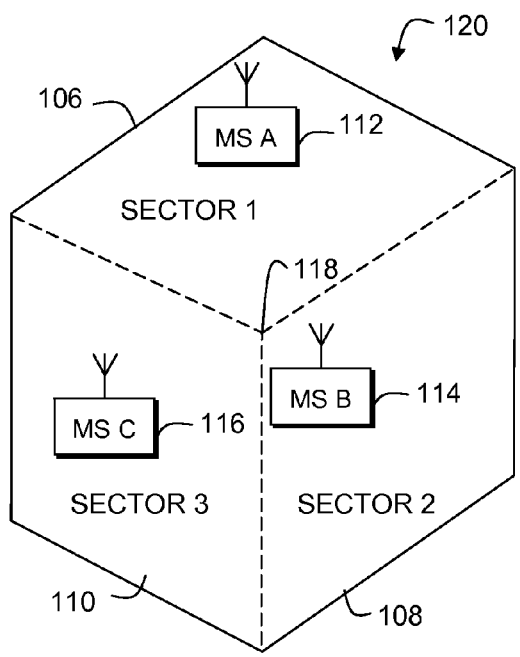
Figure 1C:
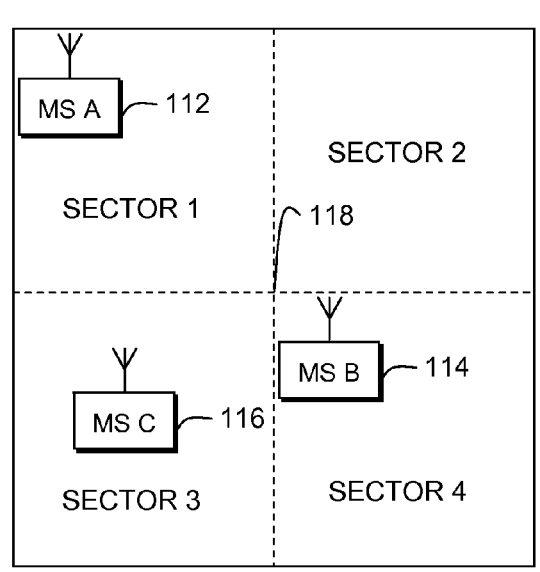

FIGS. 1A, 1B and 1C illustrate a block diagram depiction of cell in a wireless communication system, (such as the IEEE 802.16 WiMAX system or 3GPP LTE system or 3GPP LTE-A system or 3GPP2 UMB system), in accordance with the present invention. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for such wireless telecommunications systems. The communication system represents a system operable in a packet data access network that may be based on different wireless technologies.

Referring to FIG. 1A, there is shown a block diagram of a scheduler 100 adapted to support the inventive concepts of the preferred embodiments of the present invention. The scheduler is typically embodied in a processor of an access point (AP) or base station (BS) that is serving a cell site 120. Those skilled in the art will recognize that FIG. 1A, 1B and 1C does not depict all of the network equipment necessary for system to operate but only those system components and logical entities particularly relevant to the description of embodiments herein. For example, an access point or base station can comprise one or more devices such as wireless area network stations (which include access nodes (ANs), AP controllers, and/or switches), base transceiver stations (BTSs), base site controllers (BSCs) (which include selection and distribution units (SDUs)), packet control functions (PCFs), packet control units (PCUs), and/or radio network controllers (RNCs), depending on the wireless access technology. However, none of these other devices are specifically shown in FIG. 1A, 1B or 1C.

The processor of the scheduler can be coupled to a transceiver, such as a receiver and a transmitter. In general, components such as processors and transceivers are well-known. For example, AP processing units are known to comprise basic components such as, but not limited to, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using messaging flow diagrams, and/or expressed using logic flow diagrams.

Thus, given an algorithm, a logic flow, a messaging/signalling flow, and/or a protocol specification, those skilled in the art are aware of the many design and development techniques available to implement a scheduler that performs the given logic. Therefore, scheduler 100 represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the processor aspect of the present invention may be implemented in any of the devices listed above or distributed across such components. It is within the contemplation of the invention that the operating requirements of the present invention can be implemented in software, firmware or hardware, with the function being implemented in a software processor as being merely a preferred option.

The scheduler is coupled to its transceiver that uses a wireless interface for communication with one or more mobile stations, such as MS A 112, MS B 114 and MS C 116, as is known in the art.

Mobile stations (MS) or remote unit platforms are known to refer to a wide variety of consumer electronic platforms such as, but not limited to, mobile nodes (MNs), access terminals (ATs), terminal equipment, gaming devices, personal computers, and personal digital assistants (PDAs). In particular, each MS 112, 114, 116 can comprise a processor coupled to a transceiver, antenna, a keypad, a speaker, a microphone, and a display, as are known in the art and therefore not shown. Mobile stations are also known to comprise basic components such as, but not limited to, microprocessors, digital signal processors (DSPs), microcontrollers, memory devices, application-specific integrated circuits (ASICs), and/or logic circuitry. Such mobile stations are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic.

Each mobile station 112, 114, 116 receives respectively downlink signals from the transceiver of the base station that contains the timing and frequency schedule, among other parameters, to use for communications in the downlink and uplink, in accordance with the present invention. In a typical scenario, a base station is situated at the center 118 of a cell site. The base station typically controls N transceivers, each of which serves MSs 112, 114, 116 in respective sectors 106, 108, 110 of the cell. MSs can experience different channel conditions depending on their location from the base station transceiver of their sector, among other parameters. As shown in this example MS A 112 is located near a cell edge and experiences poorer channel conditions, MS B 114 is located close in to the cell 118 and experiences better channel conditions, while MS C 116 is in between.

Figure 2:
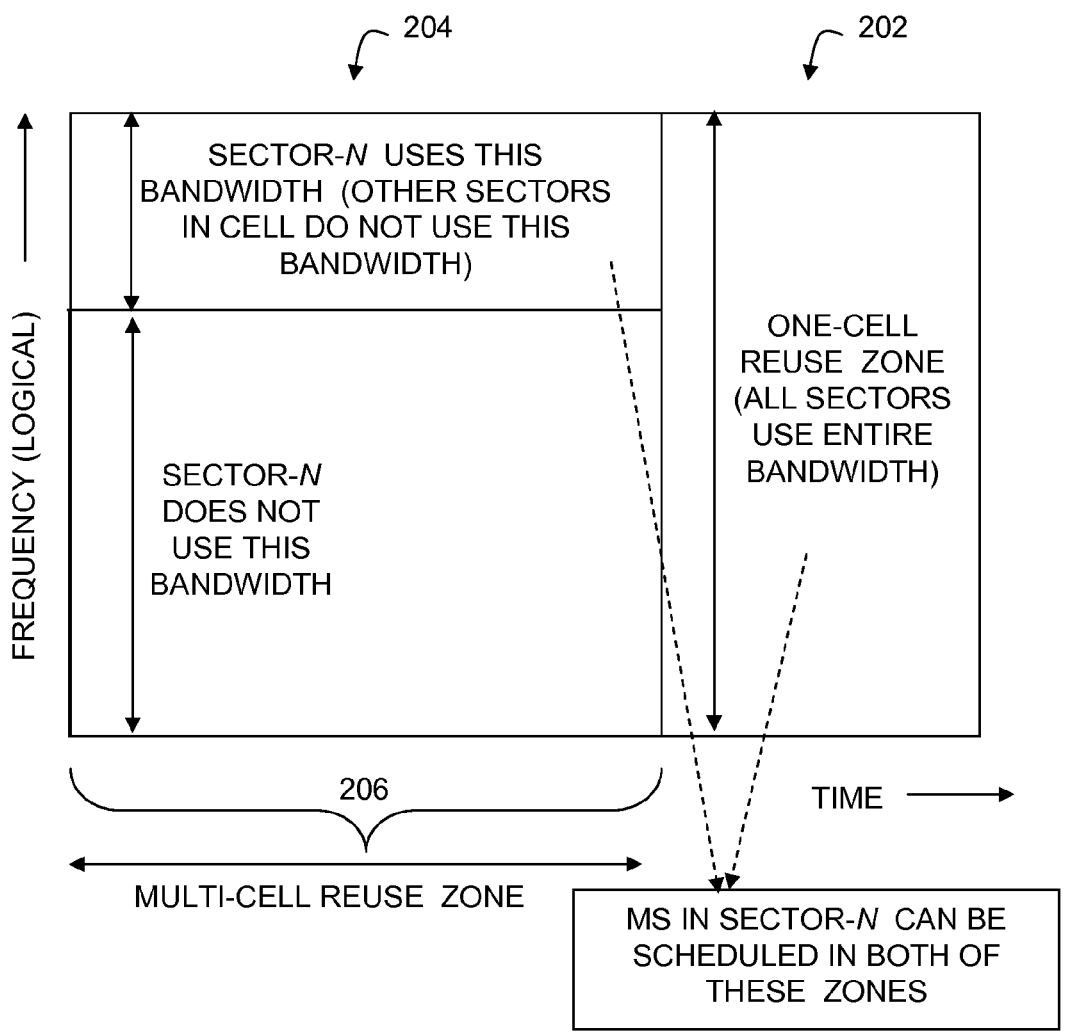
FIG. 2 and FIG. 3 illustrate diagrams of a sub-frame, as used in the system of FIG. 1A to 1C.

Referring to FIG. 2, a sub-frame 200 (e.g. a Partial Usage of Sub-Channel (PUSC) tile in IEEE 802.16 WiMaX) is shown, in accordance with one embodiment of the present invention. The sub-frame is partitioned into two resource partitions, wherein one resource partition 202 has frequency reuse of one (one-cell reuse—e.g. PUSC 1/1 time zone in the context of WiMaX), and the other resource partition 204 has a frequency reuse of greater than one (multi-cell reuse—e.g. PUSC 1/N time zone in the context of WiMaX), where each sector, sector 1 through sector N (e.g., 106, 108, 110 of FIG. 1B), is provided its own operating frequency bandwidth. Preferably, the N sectors in the multi-cell reuse time zone 204 are time synchronized 206. Optionally, it is possible to do a time division method (TDM) of one-cell reuse and multi-cell reuse sub-frames in a periodic pattern. In accordance with the present invention, a mobile station in a sector can be scheduled in both of the one-cell reuse and multi-cell reuse time zone resource partitions used by that sector, as will be detailed below.

Figure 3:
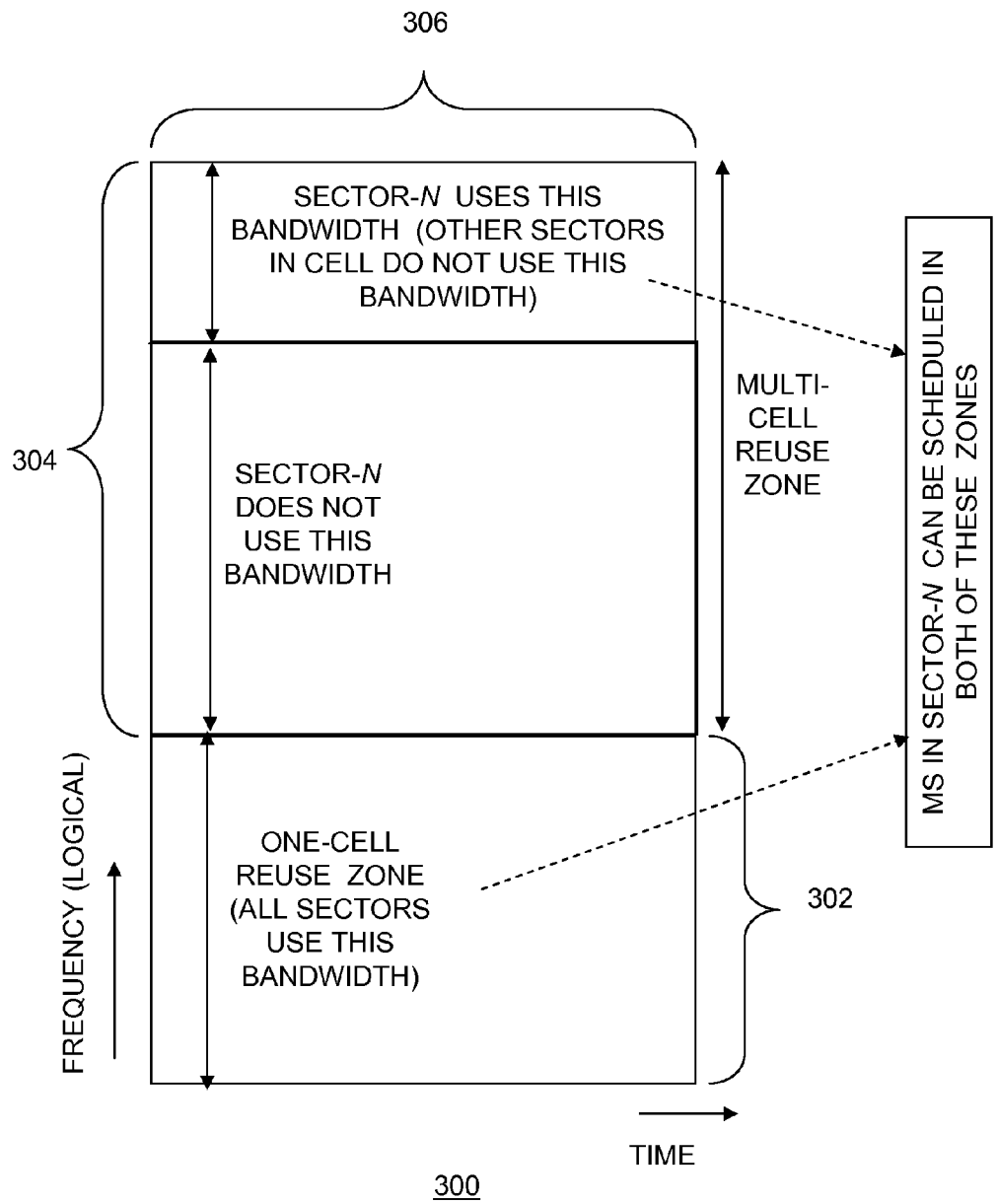

Referring to FIG. 3, a sub-frame 300 is shown, in accordance with another embodiment of the present invention. The sub-frame is partitioned into two resource partitions, wherein one resource partition 302 has frequency reuse of one (one-cell reuse), and the other resource partition 304 has a frequency reuse greater than one (multi-cell reuse), where each sector, sector 1 through sector N (e.g., 106, 108, 110 of FIG. 1B), is provided its own operating frequency bandwidth. Preferably, the N sectors in the multi-cell reuse time zone 304 are time synchronized 306. Optionally, it is possible to do a time division method (TDM) of the multi-cell reuse zone in a periodic manner across the N sectors. In accordance with the present invention, a mobile station in a sector can be scheduled in both of the zones/partitions used by that sector.

Metrics are defined for each mobile station in each zone. These metrics can include Signal-to-Noise Ratio (SNR), Carrier-to-Interference-plus-Noise-Ratio (CINR) or other channel quality indicator (CQI) measurement in that zone, spectral efficiency achievable in a zone, which is a function of SNR, CINR or CQI in that zone, and average data throughput for a mobile station. These metrics are then utilized in a Proportional Fair (PPF) scheduler (100 in FIG. 1A) to provide a PPF metric in both zones for each mobile station.

In practice, a SNR, CINR or CQI is obtained for user J in each zone, and this channel quality measurement is then used to determine, as is known in the art, a spectral efficiency in each zone for user J. An average data throughput for user J until the current time instant is also obtained. These inputs are then used to run an independent PPF scheduler in both zones for user J in order to determine a PPF metric for that user in each zone. Each zone has its own scheduler queue (102, 104 in FIG. 1A). Users are then sorted in each queue in order of their PPF metric for that zone. In this way, each user is assigned resources in both zones based on their position in the respective queue for that zone. As a result, different resources can be assigned to the same user in the different zones. In addition, the metrics used for sorting can be different in different zones. Further, users can be assigned different modulation coding schemes in different zones depending on their report channel quality measurements.

One example for a PPF metric is shown below, that can be used for either zone. A spectral efficiency, $SE_J$(zone) is determined as a function of reported CINR of user J in a zone. An average data throughput for user J, $Ave\_Tput_J$, up to the current time instant is also determined. The PPF metric for that user in that zone, $PPF_J$(zone), is then determined as $SE_J$(zone)$^\alpha$/$Ave\_Tput_J^\beta$, where $\alpha$ and $\beta$ are parameters used by the scheduler to control the fairness across users in the system. These two parameters can be varied to select a scheduling method anywhere between the two extremes of (i) round-robin scheduling ($\alpha=0$, $\beta=1$) where the scheduler attempts to equalize the average throughput achieved by all the users in the sector and (ii) maximum C/I scheduling ($\alpha=1$, $\beta=0$) where the scheduler assigns all the resources to the user that is capable of achieving the maximum spectral efficiency. Each user is then sorted in each queue (102, 104 in FIG. 1A) using its PPF metric for that zone, and is assigned resources for each zone by its position in the queue for that zone. At the end of a frame, Ave_Tput$_J$ is updated using total bits transmitted in both zones for user J, which is then used for the next sub-frame resource allocation for user J. A control message scheduling the resources is then sent to the users in the two zones.

A novel aspect of the present invention is scheduling users in a sector in both zones used by that sector. In a preferred embodiment, the scheduler (100 in FIG. 1A) maintains two separate sorted queues (102, 104 in FIG. 1A), one for each zone, wherein the PPF metric as described above is used to sort each user in both queues. In another embodiment, the scheduler can maintain only one sorted queue that is used for both zones. In this case, the PPF metric (PPF$_J$) for user J is given by PPF$_J$={$\gamma$* SE$_J$(one_cell_reuse_zone)+(1-$\gamma$)* SE$_J$(multi_cell_reuse_zone)}/Ave_Tput$_J^\beta$, where $\gamma$ is the fraction of bandwidth assigned to one-cell reuse zone, and SE$_J$ and Ave_Tput$_J$ are as previously defined.

It should also be recognized that a user can be scheduled only in one of the two zones (each zone runs its scheduler with set of users assigned to that zone), wherein a user's zone is determined by the user's long term CINR for both zones, where a configurable CINR threshold determines the user's zone. A user's zone could also be determined by the user's periodic CINR feedback for both zones, by computing the spectral efficiency for each zone (as a function of that zone's CINR) and assign the user to the zone with the higher spectral efficiency.

EXAMPLE

To evaluate the performance of the present invention, computer simulations were conducted in the context of FIG. 2 using the following IEEE 802.16/WiMAX downlink system simulation parameters. TDD split: 60/40—18 DL symbols for data (10 symbols for MAP). MIMO A/B: 2 transmit/2 receive antennas: 5 watts transmit power per antenna. Pathloss (PL) Model—COST 231: PL (dB)=128.0+35.2 log(d), d in km. Penetration loss=12 dB. MS Antenna Gain=6 dBi. Lognormal Standard deviation=8 dB. BS Antenna Configuration: 90° beamwidth, 14.5 dBi gain. System layout: 19 sites, 3 sectors/site; Mobiles dropped uniformly. Cell (site) Area=0.6 sq. km. PedB channel with all users at 3 km/hr. Traffic Models: Web Browsing & Full Buffer. CINR feedback once in 8 frames (for FFR, feedback for both PUSC 1/1 & PUSC 1/3 zones, where N=3 for the multi-cell reuse). FFR Dual-8: 8 symbols for PUSC 1/1 (one-cell reuse zone), and 10 symbols for PUSC 1/3 (three-cell reuse zone). In operation, each user "reads" for 45 seconds then transmits a 500 Kbyte file and waits for the file transmission to complete, then reads for 45 seconds and repeats this cycle until the simulation is over. File size: 4 Mbits average. Maximum size=10 Mbits. A truncated lognormal distribution was used with a standard deviation of 1.44 Mbits. Reading time (Dpc) is 45 seconds average (exponentially distributed).

Table 1 shows the improvement provided by the present invention. As can be seen, the present invention provides significant improvement over the downlink with the proposed FFR technique compared to solely using either PUSC 1/3 or PUSC 1/1.

TABLE 1

Improvement in Downlink with FFR compared to PUSC 1/3 and PUSC 1/1

| Metric | Traffic Model | Improvement over PUSC 1/3 | Improvement over PUSC 1/1 |
|---|---|---|---|
| Site Throughput | Full Buffer | 15% | 14% |
| Cell Edge Throughput | Web Browsing (120 users) | 28% | 69% |
| | Full Buffer | 3% | 50% |
| User Capacity (10% outage @ 256 Kbps) | Web Browsing | 6% | 10% |

Figure 4:
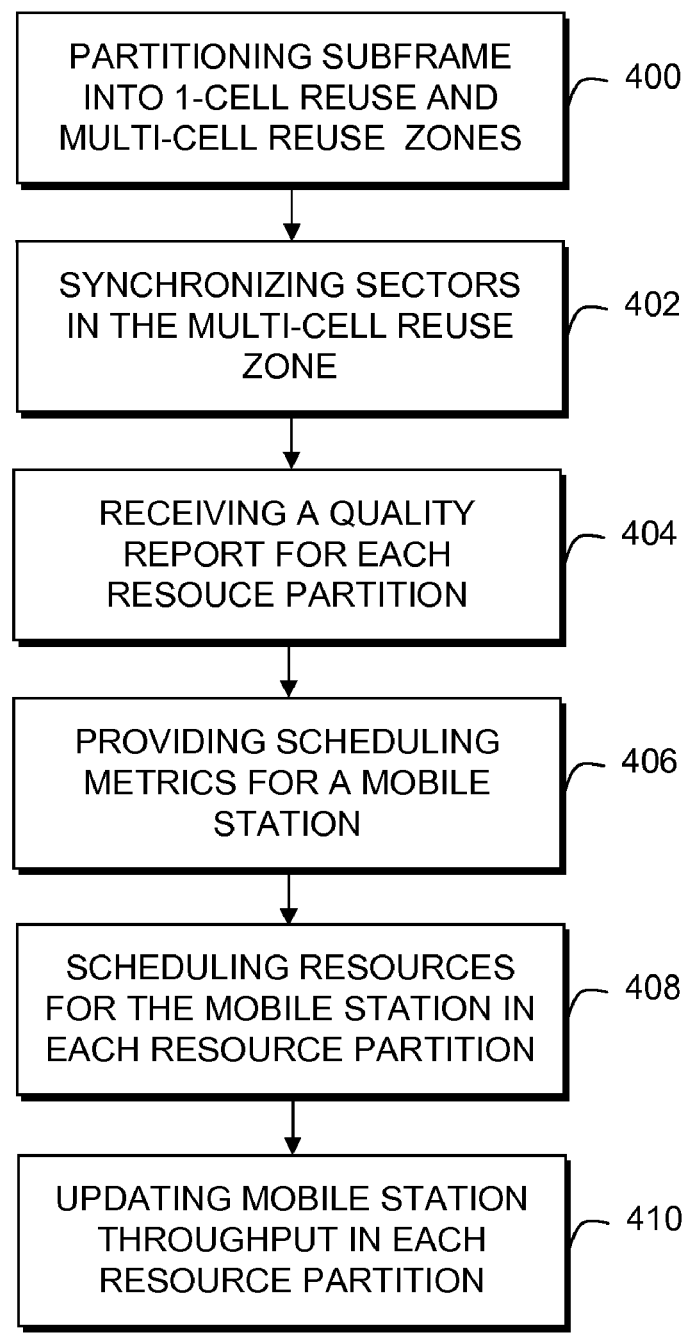
FIG. 4 is a flow chart illustrating a method, in accordance with the present invention.

FIG. 4 shows a flowchart that illustrates a method for fractional frequency reuse in a communication system.

A first step 400 includes partitioning a sub-frame into resource partitions, wherein at least one resource partition has frequency reuse of one and all other resource partitions have frequency reuse greater than one.

A next step 402 includes synchronizing sectors in those resource partitions with a frequency reuse greater than one.

A next step 404 includes receiving a channel quality report from the mobile station for each resource partition.

A next step 406 includes providing scheduling metrics for the mobile station in each resource partition. In particular, the scheduling metrics include a proportional fair metric for the mobile station in each resource partition. Specifically, the proportional fair metric (PPF) for the mobile station in any zone is given by:

$$PPF = \frac{\text{Spectral efficiency achievable in } zone^\alpha}{\text{Average throughput for mobile station until current } time^\beta}$$

where $\alpha$ and $\beta$ are fairness parameters as defined above. The spectral efficiency achievable in a zone is derived from a Signal-to-Noise Ratio (SNR) or Carrier-to-Interference-plus-Noise-Ratio (CINR) measurement in that zone.

A next step 408 includes scheduling resources for the mobile station in a sector in each resource partition used by that sector, and in particular both zones, in accordance to the scheduling metrics and the channel quality report. Scheduling 408 includes establishing an independent scheduling queue for each resource partition, and placing the mobile station data traffic into each scheduling queue. Alternatively, scheduling 408 could include establishing one scheduling queue for both resource partitions, and placing the mobile station data traffic for both resource partitions into the one scheduling queue. Optionally, this step includes sending a downlink control message to the mobile station to indicate the resources assigned to the mobile in the different partitions.

A next step 410 includes updating, at an end of a sub-frame, the average throughput in the PPF for the mobile station using the total bits transmitted in each resource partition for the mobile station.

Advantageously, the present invention combines both the one-cell reuse zone and the multi-cell reuse zone to provide good cell edge coverage and throughput without compromising overall sector and user throughput.

It will be understood that the terms and expressions used herein have the ordinary meaning as is accorded to such terms and expressions by persons skilled in the field of the invention as set forth above except where specific meanings have otherwise been set forth herein.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for fractional frequency reuse in an Orthogonal Frequency Division Multiple Access Worldwide Interoperability for Microwave Access communication system utilizing a Partial Usage of Sub-Channels (PUSC) tile structure, the method comprising
    partitioning a sub-frame into a PUSC time zone with a frequency reuse of one and a PUSC time zone with a frequency reuse greater than one;
    scheduling resources for a mobile station in a sector in both PUSC time zones used by that sector by:
        establishing a scheduling queue for each resource partition ; and
        placing mobile station data traffic into each of the scheduling queues;
    providing scheduling metrics for each mobile station in each queue; and
    receiving a channel quality report from the mobile station for each resource partition;
    wherein scheduling includes scheduling transmissions for the mobile station in a sector in each zone used by that sector according to the scheduling metrics and the channel quality report; and
    wherein the scheduling metrics include a proportional fair metric for the mobile station in each resource partition;
    wherein the proportional fair metric (PPF) for the mobile station in any zone is given by:

$PPF =$ Spectral efficiency achievable in zone$^{.alpha.}$/Average throughput for mobile station until current time$^{.beta.}$.

where .alpha. and .beta. are fairness parameters.

2. The method of claim 1 wherein the spectral efficiency achievable in a zone is derived from a Carrier-to-Interference-plus-Noise-Ratio measurement in that zone.

3. The method of claim 1 further comprising updating the average throughput in the PPF for the mobile station using the total bits transmitted in all zones for the mobile station.

* * * * *